US012111331B1

(12) United States Patent
Stroebel et al.

(10) Patent No.: US 12,111,331 B1
(45) Date of Patent: Oct. 8, 2024

(54) DENSITOMETER ASSEMBLY FOR HIGH-PRESSURE FLOW LINES

(71) Applicant: KHOLLE Magnolia 2015, LLC, Houston, TX (US)

(72) Inventors: William Brent Stroebel, Houston, TX (US); Barry B. Ekstrand, Katy, TX (US); Larry Mitchel Hill, Cypress, TX (US); Scott Taylor Donaldson, Spring, TX (US); Mark C. Dille, Magnolia, TX (US); E. Lee Colley, III, Jersey Village, TX (US)

(73) Assignee: KHOLLE Magnolia 2015, LLC

( * ) Notice: Subject to any disclaimer, the term of this patent is extended or adjusted under 35 U.S.C. 154(b) by 642 days.

(21) Appl. No.: 17/149,459

(22) Filed: Jan. 14, 2021

Related U.S. Application Data

(60) Provisional application No. 63/059,933, filed on Jul. 31, 2020.

(51) Int. Cl.
*G01N 9/24* (2006.01)
*G01N 9/36* (2006.01)

(52) U.S. Cl.
CPC .......... *G01N 9/24* (2013.01); *G01N 9/36* (2013.01); *G01N 2223/628* (2013.01)

(58) Field of Classification Search
CPC ....... G01N 9/24; G01N 9/36; G01N 2223/628
See application file for complete search history.

(56) References Cited

U.S. PATENT DOCUMENTS

| 9,529,097 B1* | 12/2016 | Dolinsky | G01T 1/202 |
| 2008/0069307 A1* | 3/2008 | Shampine | G01N 23/083 |
| | | | 378/194 |
| 2020/0216936 A1* | 7/2020 | Kamo | C22C 38/54 |

FOREIGN PATENT DOCUMENTS

| CA | 2992330 C | * 12/2019 | G01N 23/06 |
| EP | 330262 A | * 8/1989 | G01N 23/12 |
| WO | WO-9729356 A1 | * 8/1997 | G01N 23/12 |

OTHER PUBLICATIONS

"Density, Concentration and Solids Content, Non-Contacting Measurement System Overview"; Berthold Technologies (Year: 2012).*
Berthod Technologies USA, LLC, *DuoSeries LB 475 Fracturing* (Feb. 2018).
Berthold Technologies GmbH & Co. KG, *Density, Concentration and Solids Content: Non-Contacting Measurement* (Dec. 2017).
Berthold Technologies GmbH & Co. KG, *Radiometric Measurements: Accuracy, Repeatability and Errors* (Jan. 2020).
Sextro, D., *Installation and Operation of Densitometers* (pre 2019).

* cited by examiner

*Primary Examiner* — Peter J Macchiarolo
*Assistant Examiner* — Anthony W Megna Fuentes
(74) *Attorney, Agent, or Firm* — Keith B. Willhelm (57) ABSTRACT

A densitometer assembly comprises a pipe fabricated from a high-yield steel, a radioactive source, and a detector. The radioactive source is mounted on an exterior wall of the pipe and is adapted to emit gamma radiation in a defined beam. The detector is mounted on an opposing, facing exterior wall of the pipe in alignment with the gamma radiation beam and is adapted to detect gamma radiation.

48 Claims, 10 Drawing Sheets

DENSITOMETER ASSEMBLY FOR HIGH-PRESSURE FLOW LINES

FIELD OF THE INVENTION

The present invention relates generally to apparatus and methods for measuring the density of fluids passing through a flow line, especially high-pressure flow lines in systems for fracturing and other operations for stimulating oil and gas wells.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates.

The industry, therefore, relies on various techniques for improving the well and stimulating production from formations, especially formations that are relatively nonporous. Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with friction reducers or viscosifying agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

Frac jobs have become more extensive as the technology has been refined, both in terms of the pressures generated to fracture a formation and the time required to complete all stages of an operation. Prior to horizontal drilling, a typical vertical well might require fracturing in only one, two or three zones at pressures usually well below 10,000 psi. The longest horizontal extensions of a well bore now are almost three and a half miles long. Fracturing a horizontal well, therefore, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 5 thousand gallons per minute (gpm) —for several days before fracturing is complete.

All of that places increasing demands on the flow lines used in fracturing a well. The fluids used in fracturing are laden with proppant and are extremely abrasive, often corrosive as well. They are pumped through the flow lines at very high pressures and flow rates. The flow can be quite turbulent. It also can cause the flow line to vibrate. The vibration can be profound and tends to create bending stress through the system. The effects of accumulated stress over periods of time also can accelerate corrosion and erosion of flowline components. Thus, the flowlines must be extremely rugged and typically are assembled from heavy, steel components.

The slurry used to fracture a well will be carefully designed to match the formation and other characteristics of the well. Different formations may be more amenable to fracturing with different types of base fluids, such as linear gel fluids, crosslinked gel fluids, or slickwater fluids. Proppants of different size, composition, and strength may be used, and in different amounts. The fracturing operation also may involve injecting multiple slugs of fluid having different compositions. Thus, the density of fluids being pumped through the frac system commonly is monitored to ensure that the desired loading of proppant is being carried into the well.

There are various types of devices or "densitometers" available to the oil and gas industry that can continuously measure the density of fluids as they flow through a flowline. One type, radioactive densitometers, generate and measure nuclear radiation. They are based on the principle that radiation attenuates as it passes through matter of any kind. Radiometric densitometers are favored because they are mounted outside of a flow line, are extremely low maintenance, and can accurately and reliably measure density of fluids under high-pressure, high-temperature, or other extreme conditions.

Radiometric densitometers generally comprise a source that emits radiation and a detector capable of detecting the radiation. The source is mounted on one side of a pipe, or other conduit or vessel conveying or holding the fluid to be measured. The detector is mounted on the other side. The source projects a beam of gamma radiation through the conduit which is detected by the detector. Common radioactive isotopes used in the source are cesium-137, cobalt-60, and americium-241. Common detector materials are polymeric and inorganic crystals, such as doped sodium iodide. The geometry and density of, for example, a pipe is relatively constant. Thus, the degree to which radiation is attenuated as it passes through the pipe and the fluid within the pipe can be correlated to the density of the fluid.

Currently, however, the use of radiometric densitometers in frac systems is limited by hard and fast constraints. The pipes and other flowline components in frac systems, as noted, must be extremely rugged and are fabricated from tough, heavy steel. Steel is dense. Radiation emitted from a source on one side of a steel pipe will attenuate rapidly as it travels through the pipe to a detector on the other side. Thus, radiometric densitometers have been limited to use in frac systems made up of smaller diameter pipes, such as 3-inch (2.75" ID, 3.75" OD) and 4-inch (3.5" ID, 5.25" OD) pipe.

More recently, however, frac systems have begun to move away from smaller pipe. They now often incorporate much bigger pipe, such as 7-inch pipe (7.06" ID, 12.81" OD). The wall of conventional 7-inch pipe is much thicker and attenuates radiation to a much greater degree than that of smaller 3- and 4-inch pipe. The radiation is so attenuated that it is impossible to measure the density of fluid flowing through 7-inch pipes accurately or reliably.

In theory it is possible to compensate for the greater attenuation characteristics of conventional 7-inch pipe by employing a radioactive source that has increased activity or energy. It also may be possible to increase the sensitivity of the detector. Unfortunately, however, such approaches have significant drawbacks. Increasing the activity and energy of the source, for example, can potentially increase the exposure of personnel to radiation. More sensitive detector elements may be too fragile to handle service in a frac system, as those systems are exposed to the elements and are subject to extreme and prolonged vibration. The cost of the densitometer also will increase significantly. Thus, manufacturers to date have been unable to provide radioactive densitometers that may be used with large-diameter pipe in frac systems.

The statements in this section are intended to provide background information related to the invention disclosed herein. Such information may or may not constitute prior art. It will be appreciated from the foregoing, however, that there remains a need for new and improved apparatus and systems for radiometrically measuring the density of fluid in frac systems and other high-pressure fluid transportation systems. Such disadvantages and others inherent in the prior art are addressed by various aspects and embodiments of the subject invention.

SUMMARY OF THE INVENTION

The subject invention relates generally to radiometric densitometer apparatus and methods for measuring the density of fluids passing through a flow line, especially large diameter, high-pressure flow lines in frac systems. In one broad embodiment, a densitometer assembly comprises a pipe fabricated from a high-yield steel, a radioactive source, and a detector. The radioactive source is mounted on an exterior wall of the pipe and is adapted to emit gamma radiation in a defined beam. The detector is mounted on an opposing, facing exterior wall of the pipe in alignment with the gamma radiation beam and is adapted to detect gamma radiation. The steel has a significantly higher yield strength than conventional pipes used in frac systems of the same pressure rating. The walls of the pipe may be made much thinner to significantly reduce the degree to which the gamma radiation beam is attenuated, while still providing the requisite strength for high-pressure applications.

In other broad aspects and embodiments, the subject invention provides for densitometer assemblies for high-pressure flowlines. The densitometer assembly comprise a pipe, a radioactive source, and a detector. The pipe has an internal diameter greater than about 5 inches and a pressure rating of at least about 15,000 psi. The radioactive source is mounted on an exterior wall of the pipe and is adapted to emit gamma radiation in a defined beam. The detector is mounted on an opposing exterior wall of the pipe in alignment with the gamma radiation beam and is adapted to detect gamma radiation from the detector.

Other embodiments of the subject invention provide such densitometer assemblies where the high-yield steel has a yield strength of at least about 120 ksi.

Yet other embodiments provide such densitometer assemblies where the pipe is fabricated from a steel selected from the group consisting of stainless, nickel, and other low and high alloy steels.

Still other embodiments provide such densitometer assemblies where the pipe has an inside diameter greater than about 3.5 inches or an inside diameter greater than about 5 inches.

Additional embodiments provide such densitometer assemblies where the pipe is rated for pressures of at least about 5,000 psi or for pressures of at least about 15,000 psi.

Further embodiments provide such densitometer assemblies where the radioactive source comprises a radioactive source material selected from the group consisting of cesium-137, cobalt-60, and americium-241.

Other embodiments provide such densitometer assemblies where the radioactive source is a point source.

Yet other embodiments provide such densitometer assemblies where the detector comprises a gas-filled detector, a scintillator detector, or a solid-state detector.

Still other embodiments provide such densitometer assemblies where the detector is a scintillator detector comprising a scintillating element and where the scintillating element is a polymer crystal or an inorganic crystal, a sodium iodide crystal or a cobalt-doped sodium iodide crystal, or a crystal of anthracene or another aromatic hydrocarbon containing benzene rings.

Additional embodiments provide such densitometer assemblies comprising a photomultiplier, such as a solid-state photomultiplier In other aspects and embodiments, the subject invention provides for systems for measuring the density of a fluid in a fluid transportation system. The system comprises a novel densitometer assembly and a controller. The controller is connected to the photomultiplier of the densitometer. It is adapted to receive signals from the densitometer assembly and to correlate the signals to a density value.

In still other aspects and embodiments, the subject invention provides for fluid transportation systems for fracturing a well. The frac systems comprises the novel densitometer assemblies or the novel systems for measuring the density of fluid in the frac system.

In yet other aspects and embodiments, the subject invention provides for methods of measuring the density of fluid in a fluid transportation system. The method comprises assembling the novel densitometer assemblies into the fluid transportation system and measuring the density of fluid flowing through the pipe.

Other embodiments of the subject invention provide methods of measuring the density of a fluid in a fluid transportation system. They system comprises a pipe, a radioactive source, and a detector. The pipe is fabricated from a high-yield steel. The radioactive source is mounted on an exterior wall of the pipe and is adapted to emit gamma radiation in a defined beam. The detector is mounted on an opposing exterior wall of the pipe in alignment with the gamma radiation beam and is adapted to detect gamma radiation from the detector. The method comprises flowing the fluid through the pipe and operating the source and detector to generate data correlated to the density of the fluid.

Additional embodiments provide densitometer assemblies, fluid transportation systems, and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the way it may be practiced. The subject invention encompasses other embodiments consistent with the claims set forth herein.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to radioactive densitometer assemblies that may be used to measure the density of fluids transported through flow lines of systems for fracturing wells and other high-pressure fluid transportation systems. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

Figure 1:
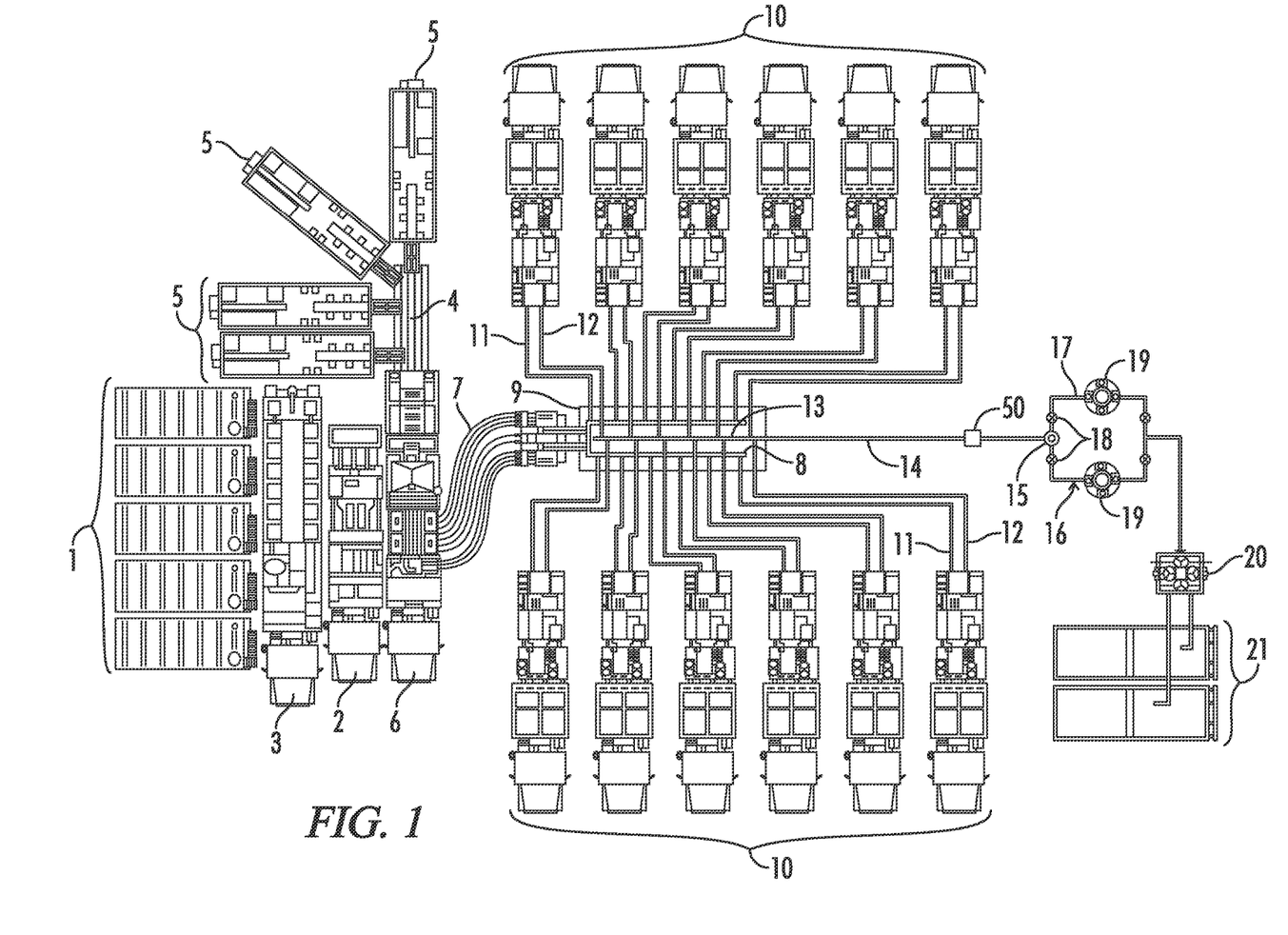
FIG. 1 is a schematic view of a system for fracturing a well and receiving flowback from the well, which system includes conventional well heads 8 and a first preferred embodiment 50 of the novel densitometer assemblies.

Systems for successfully completing a fracturing operation are extensive and complex, as may be appreciated from FIG. 1. FIG. 1 illustrates schematically what in most respects is a conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry.

The pressures and flow rates required to fracture typical oil and gas wells are extremely high: pressures up to 20,000 psi and flow rates up to 140 bbl/minute. Such pressures and rates greatly exceed the capacity of any single frac pump. The cumulative output of many frac pumps is required to reach the required pressures and flow rates. The slurry from blender 6, therefore, is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11. Pumps 10 take the slurry and discharge it at high pressure through individual high-pressure "discharge" lines 12 into a "missile" 13 on frac manifold 9.

The combined flow from pump discharge lines 12 flows through missile 13 into a high-pressure line 14 running to a junction head 15 of a "zipper" manifold 16 (also referred to by some as a "frac manifold"). As discussed further below, high-pressure line 14 also incorporates a first preferred embodiment 50 of the novel densitometer assemblies.

Zipper manifold 16 includes flow lines 17 running to, for example, two well heads 19 that control flow into and out of the well. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert 21 frac fluid into the other well head 19 to frac that well.

The high-pressure conduits conveying fluid into well head 19 are known generally in the industry as flow iron, frac iron, or ground iron. They typically are assembled from a large number of frac iron components, including straight components, such as pipe joints, junction fittings, such as tee- and wye-fittings, and directional fittings, such as elbows and swivel joints. They also include valves and other flow control or monitoring components. Since they are intended for temporary use and will be assembled and disassembled at different well sites, the flowline components typically will be assembled with various types of unions. Unions allow the components to be connected ("made up") and disconnected ("broken down") relatively quickly.

The three types of unions commonly used in frac systems are hammer (or "Weco®") unions, clamp (or "Greyloc®)") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

Figure 2:
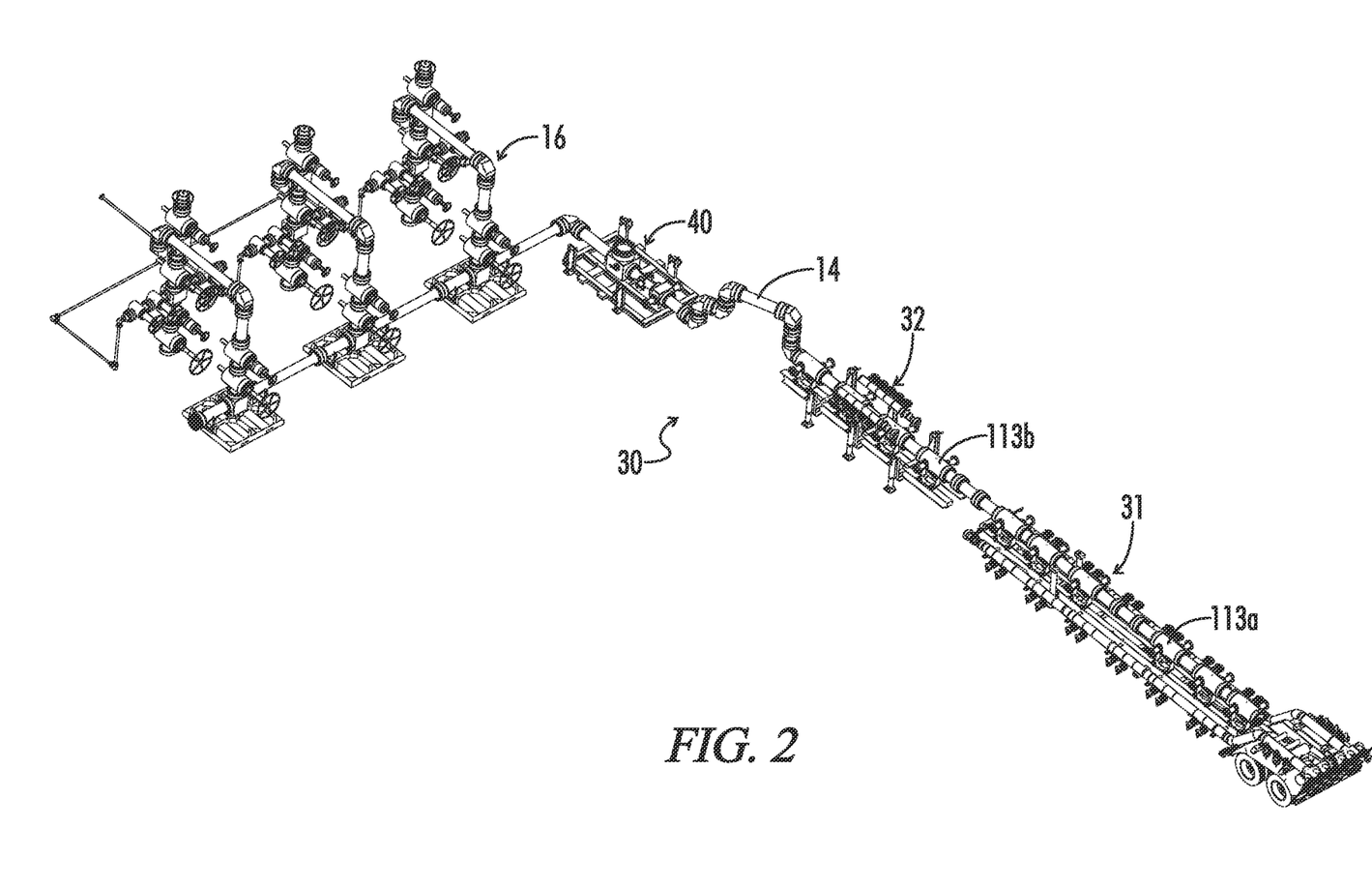
FIG. 2 is an isometric view of frac iron components of a fracturing system 30 similar to that shown in FIG. 1, frac system 30 incorporating a skidded assembly 40 including densitometer assembly 50.

FIG. 2 shows the high-pressure side, or frac iron components of a frac system similar to the system shown in FIG. 1. High-pressure system 30 comprises a frac manifold trailer 31, a frac manifold skid 32, densitometer skid 40, and zipper manifold 16, all interconnected by segments of flow line 14. Frac manifold trailer 30 comprises missile 13a, while frac manifold skid 32 comprises missile 13b. Frac manifold trailer 31 and frac manifold skid 32 are constructed generally as shown in applicant's U.S. Pat. No. 10,683,708 to L. Hill et al. Other frac manifolds may be used, however, and many conventional frac manifolds are available commercially.

Pumps (not shown), typically mounted on trucks, will be deployed on either side of frac manifold trailer 31 and skid 32 where their discharge lines may be connected easily to missiles 13. The high-pressure slurry discharged from pumps 10 then is flowed from missiles 13 through densitometer skid 33 and into zipper manifold 16. Zipper manifold 16 has various valves that will be operated to direct the slurry into one of three well heads 18. Many conventional zipper manifolds are available commercially and may be used if desired.

Figure 3:
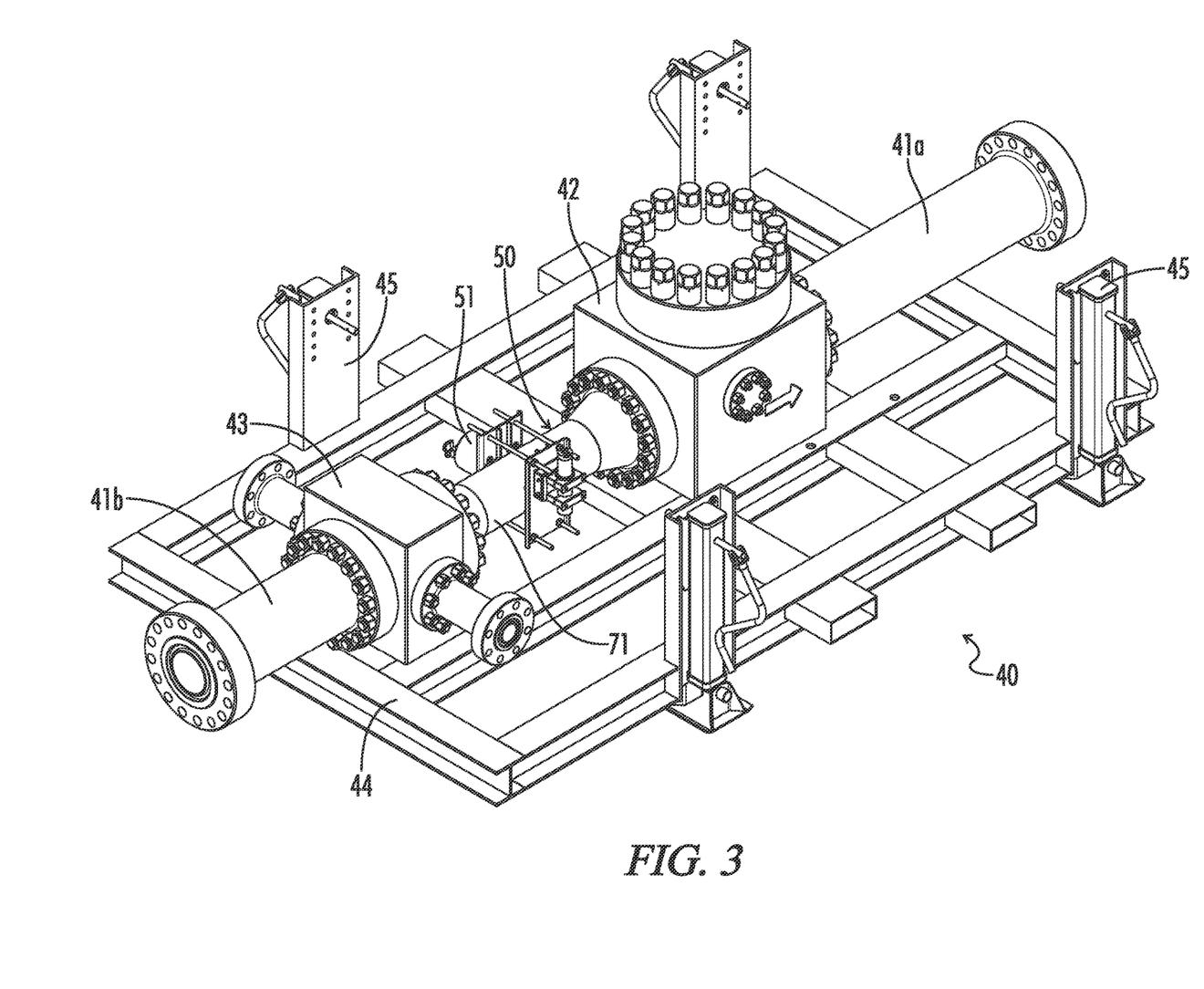
FIG. 3 is an isometric view of skid 40, including densitometer assembly 50.

Densitometer skid 40 is shown in greater detail in FIG. 3. As shown therein, skid 40 generally comprises an inlet pipe 41a, a check valve 42, densitometer assembly 50, cross junction fitting 43, and an outlet pipe 41b all mounted on a frame 44. Inlet pipe 41a will be joined to an upstream segment of flow line 14 and, at its downstream end, to check valve 42. Check valve 42 allows fluid to flow from missiles 13 toward zipper manifold 16, but prevents flow in the reverse direction. Check valve 42 is constructed generally as disclosed in applicant's U.S. Pat. No. 11,306,835 to M. Dille et al. Other check valves may be used, however, and many conventional check valves suited for frac service are available commercially.

Densitometer assembly 50 is joined at its upstream end to the outlet of check valve 42 and at its downstream end to cross junction fitting 43. Cross junction fitting 43 allows other flow lines to be connected to skid 40, for example, lines leading to a flowback manifold and tanks (not shown). Cross junction fitting 43 is joined at its downstream end to outlet pipe 41b which in turn will be joined to a downstream segment of flow line 14.

Frame 44 is assembled from steel beams welded together. Preferably, as exemplified, it is provided with jackup legs 45 to allow it to be positioned more easily as it is assembled into flow line 14. Many conventional skid designs, including those having different adjusting and leveling mechanisms, are known, however, and may be used. Densitometer assembly 50 and the other skid components also may be mounted on a rolling chassis, such as a trailer or a truck. Similarly, while the prismatic, block design of check valve 42 and cross junction fitting 43 allow them to be easily mounted on flat surfaces of frame 44, they may be mounted in other conventional ways. Other flowline components may be mounted on skid 40, and check valve 42 and cross junction fitting 44 may be mounted on other skid assemblies. Moreover, while there are distinct advantages to mounting them as subassemblies on a frame, such as frame 44 of skid 40, densitometer assembly 50 and the other skidded components also may be installed separately and need not be mounted on any kind of frame.

Figures 4A, 4B:
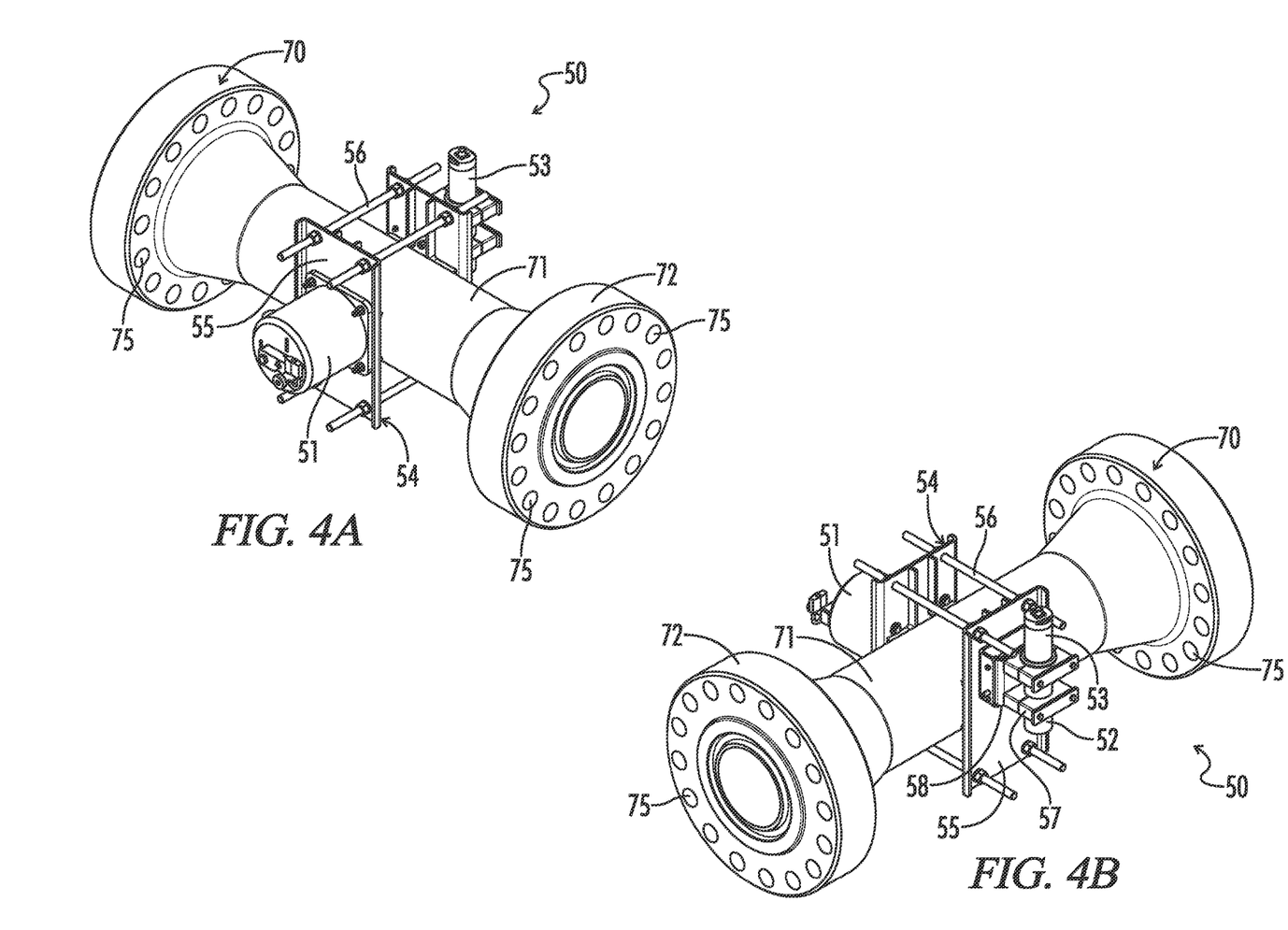
FIGS. 4A and 4B are isometric views of densitometer assembly 50 showing a densitometer source 51 and a densitometer detector 52 mounted on spool 70.

Densitometer assembly 50 is shown in greater detail in FIG. 4. As seen therein, densitometer assembly 50 comprises a source 51, a spooled pipe 70, a detector 52, and a photomultiplier 53. Source 51 and detector 52 are mounted in alignment across pipe 70, for example, on opposing exterior walls of pipe 70 by a clamp assembly 54. Clamp assembly 54 comprises a pair of plates 55 joined by threaded connectors 56. Source 51 is provided with a plate that allows it to be directly mounted on its clamp plate 55. Mounts, such as mating C-clamps 57 and bracket 58, may be used to secure detector 52 to its clamp plate 55. Any conventional mounting system, however, may be used to mount source 51 and detector 52 to pipe 70 so long as the connection is secure and allows them to be properly aligned. Many designs are known and may be used or modified for use in the novel densitometer assemblies.

Figure 5:
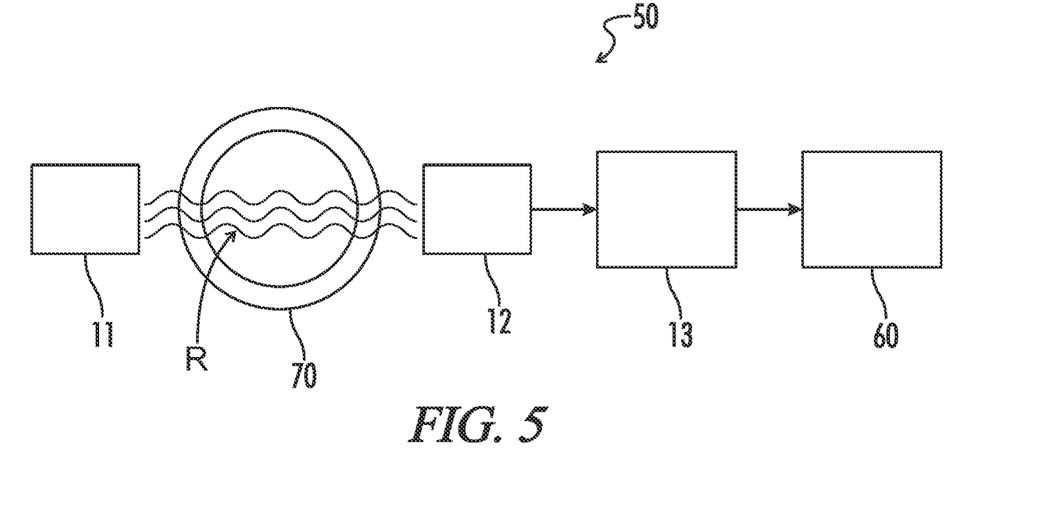
FIG. 5 is a schematic illustration of a system incorporating densitometer assembly 50.

Source 51 and detector 52 are mounted such that detector 52 is in line with a beam of radiation Remitted by source 51, as shown schematically in FIG. 5. Preferably, source 51 and detector 52 are oriented such that source 51 provides 90° irradiation, that is, radiation beam R is projected normally to the axis of pipe 70. A 90° orientation will minimize the amount of attenuation in absolute terms. They may be oriented, however, to provide irradiation at an angle oblique to pipe 70, for example, at 30° or 45° relative to the axis of pipe 70, or they may be installed across an S-bend or U-bend in pipe 70. The latter orientations can increase the amount of attenuation due to the fluid without increasing the attenuation due to the pipe. In general, the relative orientation of source 51 and detector 52 may be varied in accordance with conventional radioactive densitometer technology and may vary according to the geometry of the vessel or conduit holding or conducting the fluids to be measured.

Source 51 preferably is provided with a cesium-137 source element. Cesium-137 emits gamma radiation at 660 keV over a half-life of 30 years. It is widely used in the industry. For some applications, it may be preferable to use source elements with cobalt-60 or an americium-241 to emit the gamma radiation. In any event, source 51 will provide shielding around the radioactive source material. A shutter and typically a collimator are provided to control and focus radiation emissions from the source element.

Detector 52 preferably is provided with a scintillator element, such as a polymer crystal or inorganic crystal. Doped sodium iodide crystals, for example, are widely used scintillator elements. Crystals of anthracene or other aromatic hydrocarbons containing benzene rings also may be suitable. For some applications, other types of detectors, such gas filled or solid-state detectors may be preferred.

Detector 52 is operationally connected to photomultiplier 53. When a gamma photon hits a scintillator crystal, it will generate a light pulse. Photomultiplier 53 converts the light pulses into amplified electrical pulses. Photomultiplier 53 preferably is a solid-state single-photon-sensitive photomultiplier, such as a silicon photomultiplier. Silicon photomultipliers may have a digital output, but more typically will have an analog output. Photomultiplier tubes also may be used, but silicon photomultipliers have lower voltage requirements and are more suited for field use.

Controller 60, shown schematically in FIG. 5, is operationally connected to photomultiplier 53 and digitizes analog signals from photomultiplier 53 and counts the pulses. A count rate, typically expressed as counts per second (cps), is determined. The detected count rate then can be compared to the emitted count rate and, taking into account steady state factors and known variables such as temperature, the density of fluid in the pipe determined. Controller 60 will incorporate a suitable data storage and processing unit, such as a printed logic circuit or a laptop or similar digital computer programmed to receive and process data from photomultiplier 53. It also will comprise a suitable user interface and display, for example to display the measured density, to chart density over time, and to control operation of source 51 and detector 52. Controller 60 also preferably records relevant data and calculations and interfaces with other control devices or a distributed control system, for example, to automatically adjust the amount of proppant in the frac fluid.

Suitable sources, detectors, and controllers are commercially available, for example, from Berthold Technologies Gmbh & Co. KG, Bad Willdbad, Germany Point sources and detectors generally will be preferred. Berthold's DuoSeries LB 475 Fracturing system may be used. It also will be understood that the controller may incorporate and consist of a system of separate components, and that they are not necessarily incorporated into a single unit. For example, the detector in the DuoSeries LB 475 Fracturing unit incorporates a photomultiplier and a digital transmitter that allows for remote processing and control.

Figure 6A:
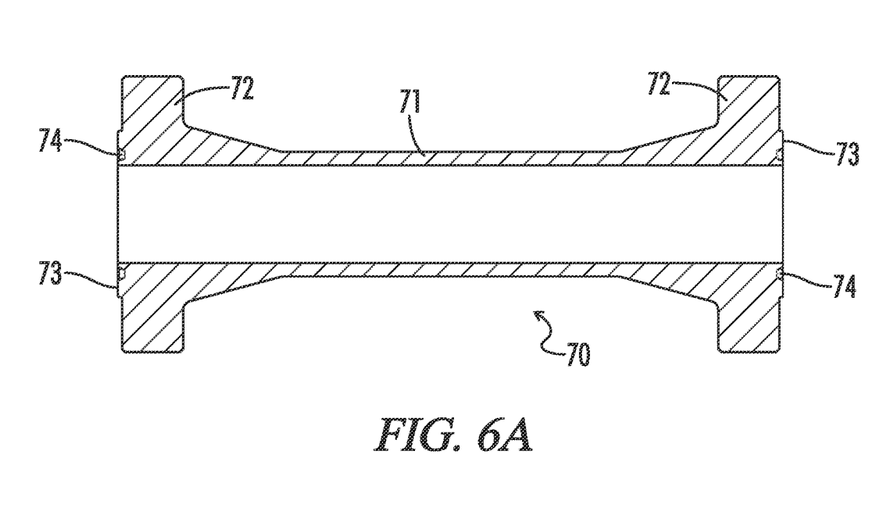
FIG. 6A is an axial cross-sectional view of spool 70 of novel densitometer assembly 50.
Figure 6B:
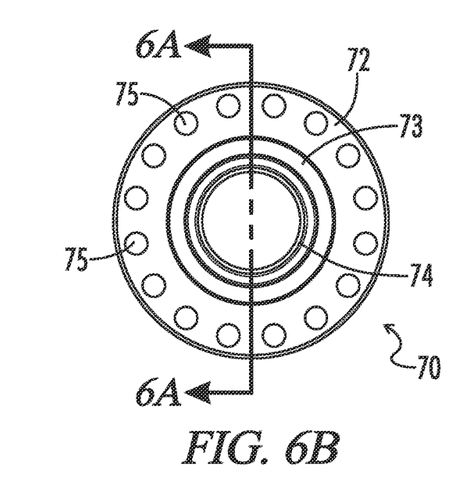
FIG. 6B is an end view of spool 70.

Spooled pipe 70 is a 7-inch spool fabricated from a high-yield steel and is shown in further detail in FIG. 6. It incorporates many features common to spooled pipe. It comprises a pipe 71 with annular flanges 72 extending radially outward from each end, thus giving it the appearance of a spool. Flanges 72 have conventional features that allow spooled pipe 70 to be joined to other flowline components, such as check valve 42, by flange unions.

In particular, the outward facing surface of flanges 72 is provided with a union face. The union face is generally flat, but has a slight, annular boss 73 that extends axially away from and around the opening of pipe 71. Annular boss 73 has an annular groove 74 in which an annular face seal, typically a metal seal (not shown), is mounted. An array of bolt holes 75 are arranged circumferentially near the edges of flanges 72. A union between spooled pipe 70 may be made-up by-passing bolts or other threaded connectors (not shown) through bolt holes 75. The threaded connectors are tightened to generate axial load across annular boss 73 and the seal, thus providing a robust connection between the components.

Flange unions may be made up and broken down with relative ease. Their basic design is robust and reliable. Like other flowline components, components having flange union subs are fabricated from heavy, high tensile steel. Thus, they have been adapted for low pressure (1,000 to 2,000 psi), medium pressure (2,000 to 6,000 psi), and high-pressure service (6,000 to 20,000 psi). Components rated for high-pressure service are particularly suitable for use in systems for fracturing oil and gas wells.

The pipe of the novel assemblies, however, have relatively thin walls as compared to pipes of the same inner diameter and pressure ratings with which densitometers have been used conventionally. For example, pipe 70 may be made from heat-treated AISI 4340, a medium carbon, low alloy nickel chromium molybdenum steel. It has a yield strength of 120 kilo-pound per square inch (ksi). Other high yield steels also may be suitable, such as stainless, nickel, and other low and high alloy steels. Preferably the steels are all clean and free from impurities and have yield strengths of at least about 120 ksi. In contrast, 7-inch pipes commonly used in frac systems are fabricated from AISI 4130 steel.

AISI 4130 steel is a low alloy steel with high amounts of chromium. It has a yield strength of 75 ksi. Thus, the walls of 7-inch pipe fabricated from AISI 4130 steel are relatively thick as compared to the walls of 7-inch pipe of the same pressure ratings that are used in the novel assemblies.

Figure 7A:
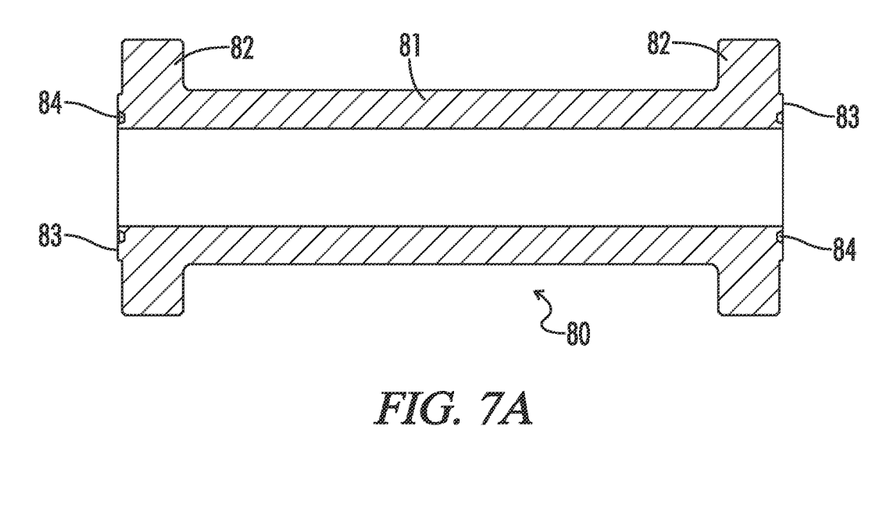
FIG. 7A (prior art) is an axial cross-sectional view of a conventional spool 80 fabricated from AISI 4130 steel.
Figure 7B:
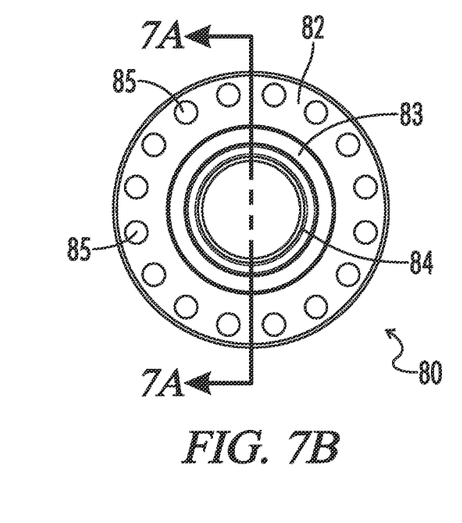
FIG. 7B (prior art) is an end view of spool 80.

The difference may be readily appreciated by comparing FIG. 6 with FIG. 7, which show, respectively, spooled pipe 70 and a spooled pipe 80 as is conventionally used in frac systems. Spooled pipe 80 is a conventional spool fabricated from AISI 4130 steel. Both it and spooled pipe 70 of novel densitometer assembly 50 are rated for pressures of 15,000 psi. They have the same basic design. As shown therein, conventional spool 80 fabricated from AISI 4130 steel has an ID of 7.06", an OD of 12.81", and wall thickness of 2.88". Spool 70 is fabricated from AISI 4340 steel and has the same ID of 7.06". In contrast to spool 80, however, it has an OD of 9" and wall thickness of 0.97".

The radiation beam generated by conventional densitometers is too attenuated to provide sufficient data for density measurements when passed through spool 80. The travel path through the walls of pipe 70, however, is about 34% as long as the path through the walls of pipe 80 (1.94" vs. 5.76"). The attenuation of the radiation beam is significantly less for spool 70. Thus, accurate density measurements may be made with conventional densitometer sources and detectors and, specifically, without increasing the activity or energy of the source element in conventional sources.

It will be appreciated, therefore, that the novel densitometer assemblies may be used in relatively large diameter flow lines beyond the limits of conventional densitometer assemblies. They will allow well operators to obtain the many benefits of frac systems with large conduits without resorting to less accurate, less reliable densitometer systems. Thus, the spools used in the novel densitometer assemblies preferably will have an inside diameter greater than about 3.5 inches, and more preferably, greater than about 5 inches, and have a pressure rating of at least about 5,000 psi, and more preferably, at least about 15,000 psi.

However, while the advantages of fabricating spool 70 from AISI 4340 and other high yield steel are particularly important for larger diameter spools with higher pressure ratings, such steel may be used to fabricate spools having smaller diameters and lower pressure ratings. By doing so, it may be possible to use a lower power, lower activity source that poses less risk to those handling it, while still providing sufficient radiation to generate accurate density measurements.

The novel densitometer assemblies have been exemplified in the context of spooled pipe. Spooled pipe, such as pipe 70, can be readily joined with and disassembled from other flowline components via flange unions. If desired, however, the ends of pipe may be threaded, or they may be provided with subs allowing the pipe to be assembled with hammer or clamp unions.

Piping, such as spooled pipe 70, not only provides a conduit for fluid flowing through a system, but it also provides a convenient base for the densitometer assembly. Pipes have consistent, predictable geometry and allow a source and detector to be mounted easily by conventional mounts. The novel densitometer assemblies, however, also may use other conduit components as a base. For example, a source and detector may be mounted on extending portions of tee, wye, and other junction fittings. Many such fittings, or a portion thereof, have a generally cylindrical geometry. The source and detector may be assembled to them with mounts similar to those used with pipe.

High pressure systems, such as system 30, however, may use fittings and components that do not have a generally cylindrical geometry. The body of check valve 42 in densitometer skid 40, for example, has a generally prismatic geometry. Fittings having a generally prismatic geometry provide flat surfaces that may allow a source and detector to be mounted more easily, or for the densitometer assembly itself to be handled and assembled in a flow line more conveniently. Thus, the novel densitometer assemblies may utilize fittings other than pipe, as defined narrowly to require generally cylindrical geometry, that provide a conduit and have a cylindrical or non-cylindrical geometry upon which a source and detector may be mounted. Like spool 70, the fittings also will be made of high yield steel so that the walls of the conduit, or at least portions of the conduit walls through which radiation is projected, may be made thinner than the conduit walls of otherwise similar fittings of the same pressure rating made of steels used conventionally.

Figure 8A:
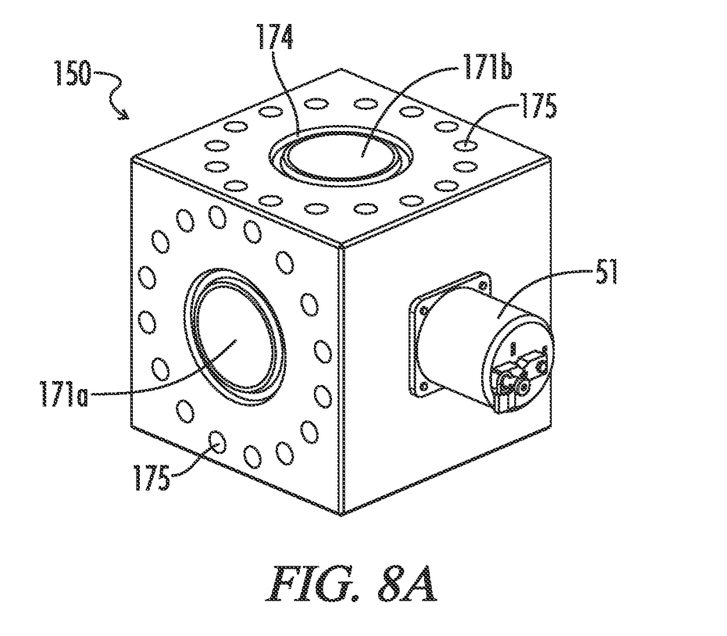
FIGS. 8A and 8B are isometric views of a second preferred embodiment 150 of the novel densitometer assemblies showing densitometer source 51 and densitometer detector 52 mounted on a prismatic tee fitting 170.
Figure 8B:
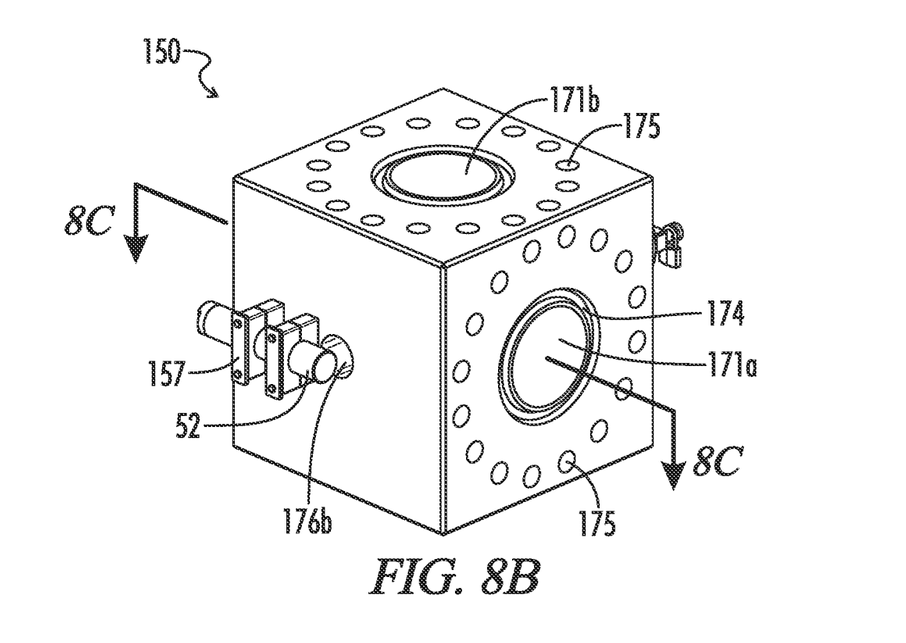
Figure 8C:
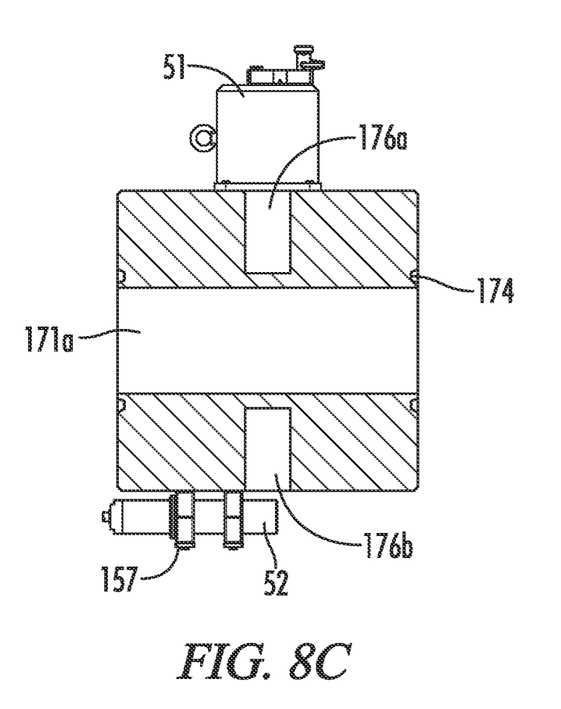
FIG. 8C is a cross-sectional view of densitometer assembly 150 taken generally along line 8C-8C of FIG. 8B.

For example, a second preferred embodiment 150 of the novel densitometer assemblies is shown in FIG. 8. As may be seen therein, densitometer assembly 150 comprises a tee fitting 170. Tee fitting 170 has a generally cubic geometry. A main bore 171a extends through fitting 170 from opposing surfaces of the cube. Main bore 171a provides a conduit through which fluid may flow. A feed bore 171b extends into main bore 171a from another surface of fitting 170. The surfaces of fitting 170 through which conduits 171a and 171b extend, like flanges 72 of spooled pipe 70, are provided with flange union faces including, for example, an annular seal groove 174 and an array of bottomed holes 175. The flange union faces allow fitting 170 to be assembled to other flowline components by flange unions.

Source 51 and detector 52 are mounted on opposing surfaces of fitting 170, for example, by connectors threaded into corresponding threaded holes in fitting 170. As shown in FIG. 8A, the bottom plate of source 51 is connected directly to fitting 170 by threaded connectors. Detector 52, as shown in FIG. 8B, is mounted on the other side of fitting 170 by a pair of mating C-clamps 157. Threaded connectors extend through C-clamps 157 into fitting 170. More elaborate mounting systems, such as bracket assembly 52 in densitometer assembly 50, are not necessary.

Conventional prismatic fittings, like conventional spooled pipe 80, typically are made of AISI 4130 steel or similar steels. Especially when they have larger diameter conduits and are rated for higher pressures, the conduit walls may be so thick that radiation is attenuated to a degree that prevents accurate density measurements. Like spooled pipe 70, however, fitting 170 is fabricated of high yield steel. Thus, the conduit walls in alignment with source 51 and detector 52, through which radiation is projected, may be made sufficiently thin to allow accurate density measurements while still holding high pressure in main bore 171a, even when it has a relatively large diameter. Elsewhere, in portions through which radiation is not projected, the walls surrounding main bore 171a may be thicker.

Fitting 170 may be sized to provide the required wall thickness. If not, however, portions of the conduit walls may be thinned out as necessary. As seen best in FIG. 8C, for example, fitting 170 is provided with bottomed radiation bores 176a and 176b that extend radially inward from, respectively, the opposing surfaces of fitting 170 on which source 51 and detector 52 are mounted. Source 51 is mounted over and projects radiation through radiation bore 176a, across main bore 171a, and into radiation bore 176b. Detector 52 is mounted over radiation bore 176b, both of which are aligned with the beam radiated by source 51. Radiation bores 176 extend toward, but stop short of main bore 171a, leaving thinned out portions. Since fitting 170 is fabricated of high yield steel, the thinned-out portions may be thin enough to allow transmission of enough radiation to provide accurate density measurements, yet still be strong enough to hold high pressures in main bore 171a.

Figure 9A:
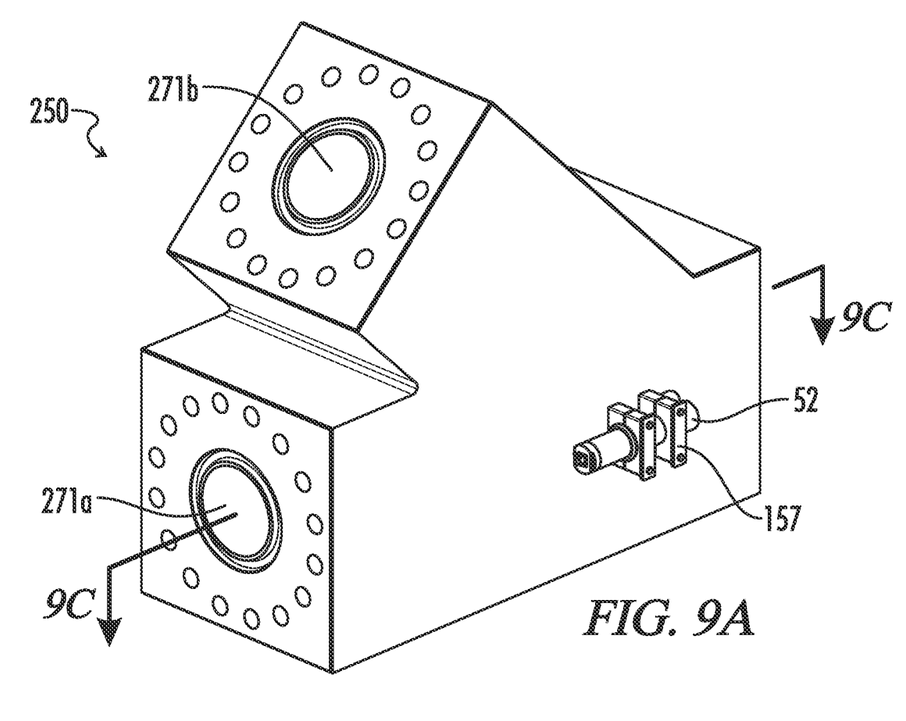
FIGS. 9A and 9B are isometric views of a third preferred embodiment 250 of the novel densitometer assemblies showing densitometer source 51 and densitometer detector 52 mounted on a prismatic lateral junction fitting 270.
Figure 9B:
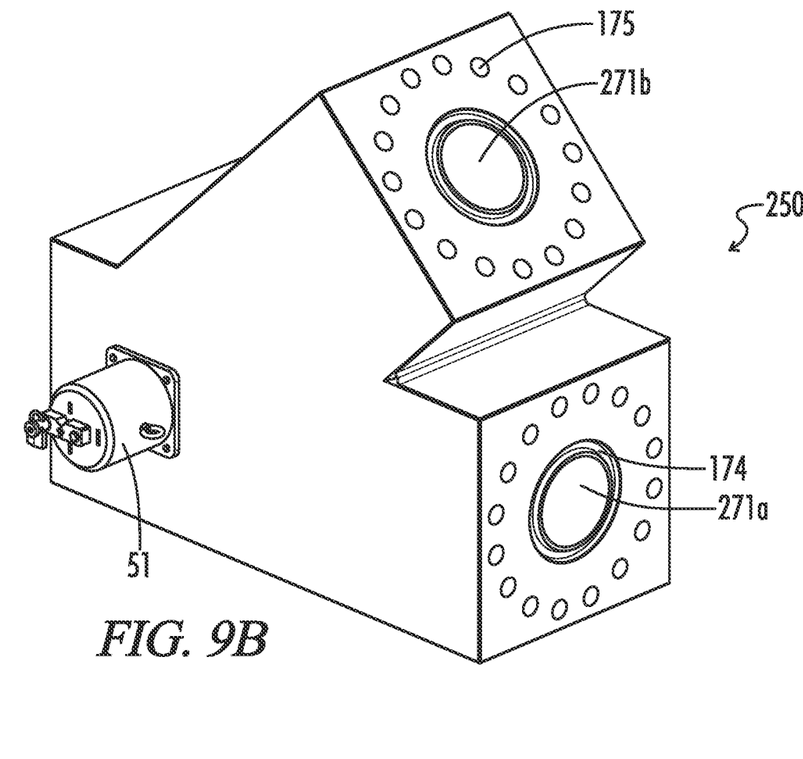
Figure 9C:
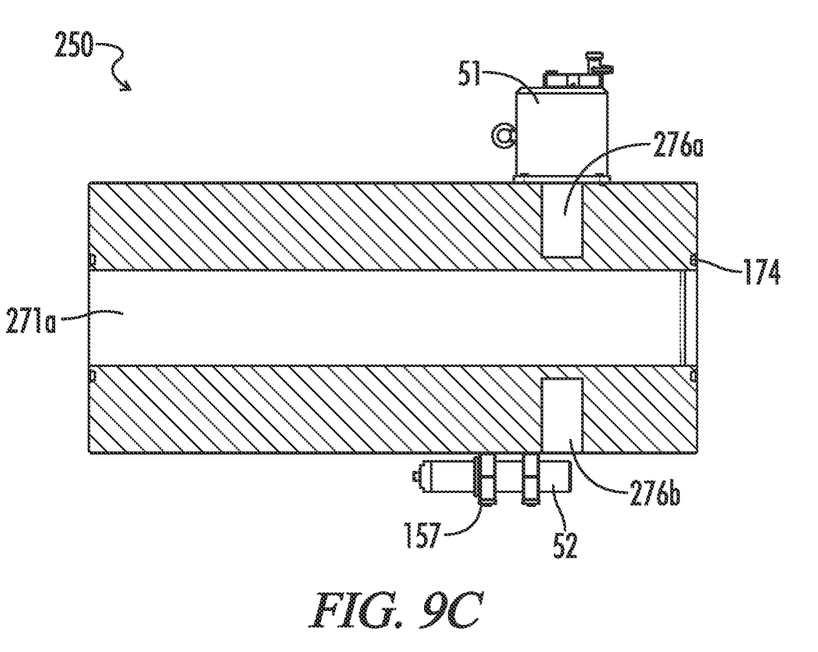
FIG. 9C is a cross-sectional view of densitometer assembly 250 taken generally along line 9C-9C of FIG. 9B.

A third preferred embodiment 250 of the novel densitometer assemblies is shown in FIG. 9. As may be seen therein, densitometer assembly 250 comprises a lateral junction fitting 270. Like tee fitting 170, junction fitting 270 is fabricated from high yield steel and has a generally prismatic geometry. A main bore 271a extends axially through the main portion of junction fitting 270. Main bore 271a provides a conduit through which fluid may flow. A feed bore 271b extends through a laterally extending arm portion into main bore 271a. Junction fitting 270, like tee fitting 170, is provided with flange union faces that allow fitting 270 to be assembled to other flowline components by flange unions.

Source 51 and detector 52 are mounted on opposing surfaces of fitting 270 as in tee fitting 170. Source 51 is mounted directly to fitting 270, while detector 52 is mounted with C-clamps 157. Like tee fitting 170, junction fitting 270 also has thinned out walls through which radiation may be projected. For example, source 51 is mounted over a radiation bore 276a, and detector 52 is mounted over a radiation bore 276b. Fitting 270, being fabricated from high yield steel, is thus able to hold high pressures within large-diameter conduits while allowing accurate density measurements of fluid flowing through the conduit.

The novel densitometer assemblies also have been exemplified in the context of specific frac systems. They may be adapted for use in other conventional frac systems. They also may be used in other high-pressure fluid transportation systems where it is important to monitor fluid density.

While this invention has been disclosed and discussed primarily in terms of specific embodiments thereof, it is not intended to be limited thereto. Other modifications and embodiments will be apparent to the worker in the art.

What is claimed is:

1. A densitometer assembly for high-pressure flowlines, said densitometer assembly comprising:
    (a) a pipe having an inside diameter of about 5 inches or greater and walls of about 1 inch or less, said pipe being rated for pressures of at least about 5,000 psi and fabricated from steel having a yield strength of at least about 120 ksi;
    (b) a radioactive source mounted on an exterior wall of said pipe; said source being configured to emit gamma radiation in a defined beam; and
    (c) a detector mounted on an opposing exterior wall of said pipe in alignment with said gamma radiation beam; said detector being configured to detect gamma radiation from said detector and generate data sufficient to calculate a density of fluid flowing through said pipe.

2. The densitometer assembly of claim 1, wherein said pipe is fabricated from a steel selected from the group consisting of stainless, nickel, and other alloy steels.

3. The densitometer assembly of claim 1, wherein said pipe is rated for pressures of at least about 15,000 psi.

4. A fluid transportation system for fracturing a well, wherein said system comprises the densitometer assembly of claim 3.

5. The densitometer assembly of claim 1, wherein said radioactive source comprises a radioactive source material selected from the group consisting of cesium-137, cobalt-60, and americium-241.

6. The densitometer assembly of claim 1, wherein said radioactive source is a point source.

7. The densitometer assembly of claim 1, wherein said detector comprises a gas-filled detector, a scintillator detector, or a solid-state detector.

8. The densitometer assembly of claim 7, wherein said detector is a scintillator detector comprising a scintillating element.

9. The densitometer assembly of claim 8, wherein said scintillating element is a polymer crystal or an inorganic crystal.

10. The densitometer assembly of claim 8, wherein said scintillating element is a sodium iodide crystal or a cobalt-doped sodium iodide crystal.

11. The densitometer assembly of claim 8, wherein said scintillating element is a crystal of anthracene or another aromatic hydrocarbon containing benzene rings.

12. The densitometer assembly of claim 1, wherein said assembly comprises a photomultiplier.

13. The densitometer assembly of claim 12, wherein said photomultiplier is a solid-state photomultiplier.

14. A system for measuring the density of a fluid in a fluid transportation system, said system comprising:
(a) the densitometer assembly of claim 12; and
(b) a controller connected to said photomultiplier of said densitometer and configured to receive signals therefrom and to correlate said signals to a density value.

15. A fluid transportation system for fracturing a well, wherein said system comprises the densitometer assembly of claim 14.

16. A fluid transportation system for fracturing a well, wherein said system comprises the densitometer assembly of claim 1.

17. A method of measuring the density of fluid in a fluid transportation system, said method comprising:
(a) assembling the densitometer assembly of claim 1 into said fluid transportation system; and
(b) measuring the density of fluid flowing through said pipe.

18. The densitometer assembly of claim 1, wherein said pipe has an inside diameter of about 7 inches or greater.

19. The densitometer assembly of claim 18, wherein said pipe is rated for pressures of at least about 15,000 psi.

20. The densitometer assembly of claim 19, wherein said radioactive source is a cesium-137 source material.

21. A fluid transportation system for fracturing a well, wherein said system comprises the densitometer assembly of claim 20.

22. A fluid transportation system for fracturing a well, wherein said system comprises the densitometer assembly of claim 19.

23. A fluid transportation system for fracturing a well, wherein said system comprises the densitometer assembly of claim 18.

24. The densitometer assembly of claim 1 wherein:
(a) said pipe:
i) provides a conduit having a diameter of about 5 inches or greater;
ii) has a non-cylindrical geometry providing a first wall portion of said conduit and a second wall portion of said conduit, said second wall portion being opposite said first wall portion; and
iii) wherein the combined thickness of said first and second wall portions are less that about 2 inches; and
(b) wherein said radioactive source and said detector are mounted on said pipe such that said gamma radiation beam is projected through said first and second wall portions.

25. The densitometer assembly of claim 24, wherein said pipe comprises at least one bottomed bore leading to said first wall portion or said second wall portion.

26. The densitometer assembly of claim 24, wherein said pipe has an inside diameter of about 7 inches or greater.

27. The densitometer assembly of claim 26, wherein said pipe is rated for pressures of at least about 15,000 psi.

28. The densitometer assembly of claim 27, wherein said radioactive source is a cesium-137 source material.

29. A fluid transportation system for fracturing a well, wherein said system comprises the densitometer assembly of claim 28.

30. A fluid transportation system for fracturing a well, wherein said system comprises the densitometer assembly of claim 2.

31. The densitometer assembly of claim 24, wherein said pipe is rated for pressures of at least about 15,000 psi.

32. A method of measuring the density of a fluid in a system for transporting fluid into an oil and gas well at pressures at least about 5,000 psi, wherein:
(a) said system comprises:
i) a pipe having an inside diameter of about 5 inches or greater and wall thickness of about 1 inch or less, said pipe being rated for pressures at least about 5,000 psi and being fabricated from a steel having a yield strength of at least about 120 ksi;
ii) a radioactive source mounted on an exterior wall of said pipe, said source being configured to emit gamma radiation in a defined beam; and
iii) a detector mounted on an opposing exterior wall of said pipe in alignment with said gamma radiation beam, said detector being configured to detect gamma radiation from said detector; and
(b) wherein said method comprises:
i) flowing said fluid through said pipe; and
ii) operating said source and detector to generate data correlated to the density of said fluid as it flows through said pipe.

33. The method of claim 32, wherein said pipe has an inside diameter of about 7 inches or greater.

34. The method of claim 33, wherein said pipe is rated for pressures of at least about 15,000 psi.

35. The method of claim 34, wherein said radioactive source is a cesium-137 source material.

36. The method of claim 34, wherein said radioactive source is a cesium-137 source material.

37. The method of claim 36, wherein said fluid is flowed through said pipe at flow rates from about 2,000 to about 5,000 gallons/minute.

38. The method of claim 34, wherein said fluid is flowed through said pipe at flow rates from about 2,000 to about 5,000 gallons/minute.

39. The method of claim 33, wherein said radioactive source is a cesium-137 source material.

40. The method of claim 39, wherein said fluid is flowed through said pipe at flow rates from about 2,000 to about 5,000 gallons/minute.

41. The method of claim 33, wherein said fluid is flowed through said pipe at flow rates from about 2,000 to about 5,000 gallons/minute.

42. The method of claim 32, wherein said pipe is rated for pressures of at least about 15,000 psi.

43. The method of claim 42, wherein said radioactive source is a cesium-137 source material.

44. The method of claim 43, wherein said fluid is flowed through said pipe at flow rates from about 2,000 to about 5,000 gallons/minute.

45. The method of claim 42, wherein said fluid is flowed through said pipe at flow rates from about 2,000 to about 5,000 gallons/minute.

46. The method of claim 32, wherein said radioactive source is a cesium-137 source material.

47. The method of claim 46, wherein said fluid is flowed through said pipe at flow rates from about 2,000 to about 5,000 gallons/minute.

48. The method of claim 32, wherein said fluid is flowed through said pipe at flow rates from about 2,000 to about 5,000 gallons/minute.

\* \* \* \* \*

UNITED STATES PATENT AND TRADEMARK OFFICE
CERTIFICATE OF CORRECTION

PATENT NO. : 12,111,331 B1
APPLICATION NO. : 17/149459
DATED : October 8, 2024
INVENTOR(S) : William Brent Stroebel et al.

Page 1 of 1

It is certified that error appears in the above-identified patent and that said Letters Patent is hereby corrected as shown below:

In the Claims

In Claim 30, at Column 14, Line 19, delete "claim 2", and insert therein, -- claim 27 --.

Signed and Sealed this
Twenty-ninth Day of April, 2025

Coke Morgan Stewart
*Acting Director of the United States Patent and Trademark Office*